United States Patent [19]

Perlman et al.

[11] Patent Number: 5,086,428
[45] Date of Patent: Feb. 4, 1992

[54] RELIABLE BROADCAST OF INFORMATION IN A WIDE AREA NETWORK

[75] Inventors: Radia J. Perlman, Acton; George Varghese, Bradford; Anthony G. Lauck, Wellesley, all of Mass.

[73] Assignee: Digital Equipment Corporation, Maynard, Mass.

[21] Appl. No.: 364,470

[22] Filed: Jun. 9, 1989

[51] Int. Cl.$^5$ ............................................. H04J 3/24
[52] U.S. Cl. ..................................... 370/94.1; 370/60
[58] Field of Search ................. 370/94.1, 60, 61, 44.1; 340/825.05

[56] References Cited

U.S. PATENT DOCUMENTS

| | | | |
|---|---|---|---|
| 4,466,060 | 8/1984 | Riddle | 364/200 |
| 4,534,024 | 8/1985 | Maxemchuk et al. | 370/85.1 |
| 4,607,363 | 8/1986 | Platel et al. | 370/94.1 |
| 4,617,657 | 10/1986 | Dryman et al. | 370/60 |
| 4,679,189 | 7/1987 | Olson et al. | 370/60 |
| 4,706,080 | 11/1987 | Sincoskie | 340/825.02 |
| 4,740,954 | 4/1988 | Cotton et al. | 370/60 |
| 4,742,511 | 5/1988 | Johnson | 370/94.1 |
| 4,825,206 | 4/1989 | Brice, Jr. et al. | 340/825.02 |

OTHER PUBLICATIONS

Gallagher et al., (Chaper 5, of *Data Networks*, Prentice-Hall, Englewood Cliffs, NJ, 1987).
Perlman (U.S. Patent application Ser. No. 07/349,448 filed May 9, 1989, Assigned to the Assignee of the Present Application).
Perlman ("Fault-Tolerant Broadcast of Routing Information", Computer Networks 7 (1983), North-Holland, Inc., pp. 395-405).
Humblet et al. ("Topology Broadcast Algorithms", Computer Networks and ISDN System 16 (1988/89), North-Holland, Inc., pp. 179-186).
Dijkstra, "A Note on Two Problems in Connexion with Graphs", *Numerische Mathematick*, vol. 1, (1959), pp. 269-271.
J. Moy, "The OSPF Specification", Proteon, Inc. (Oct. 1989), pp. i-102.
ISO, "Intermediate System to Intermediate System Intra-Domain Routeing Exchange Protocol for Use in Conjunction with the Protocol for Providing the Connectionless-Mode Network Service (ISO 8473)" (Oct. 15, 1989), pp. i-138.

Primary Examiner—Douglas W. Olms
Assistant Examiner—Dang Ton
Attorney, Agent, or Firm—Fish & Richardson

[57] ABSTRACT

A method and apparatus for creating and managing databases in routers of a routing network. The databases store link state packets, each packet being originated by nodes in the network, and transmitted to other nodes through the network. Each packet contains data identifying its originating node, a sequence number in a linear space indicating its place in the sequence of packets generated by its originating node, and an age value indicating the time remaining before it expires. The contents of the databases are updated by newly received packets. In addition, the nodes themselves are reset if the packets currently in the network have later sequence numbers than new packets. Also, a mechanism is provided to purge the databases of packets from a given router by issuing a purging packet.

21 Claims, 4 Drawing Sheets

RELIABLE BROADCAST OF INFORMATION IN A WIDE AREA NETWORK

BACKGROUND OF THE INVENTION

This invention relates to routing of data in computer networks.

In order for routers in such a network to store and forward data (ordinarily grouped into "packets"), each router needs to track current control information issued by other routers in the network. For example, if router A generates Ainfo(1), it is necessary for another router B to receive Ainfo(1). Later, when A generates Ainfo(2), router B needs to receive Ainfo(2). If a router C subsequently issues Cinfo(1), router B must track both Ainfo(2) and Cinfo(1), because Ainfo(2) is the latest information generated by router A and Cinfo(1) is the latest information generated by router C.

In one scheme for computing routes through a network, each router is responsible for ascertaining the identity of its neighbors, by following local handshaking protocols and generating special packets known as link state packets. Link state packets (LSPs) list each router's neighbors together with attributes of the links to the neighbors (such as "cost") which are of relevance to the routing algorithm. Each router periodically generates a new LSP which supersedes its previously generated LSPs. If the most recent LSPs are propagated reliably to all of the routers, each router has complete information about the current topology of the network and can thus use any well known algorithm for computing routes (such as Dijkstra's algorithm).

One way to indicate the relative age of LSPs among the LSPs of a given originating router is to assign a sequence number to each LSP. The sequence number is incremented for each new LSP. When a router receives a LSP, it compares that LSP's sequence number with the sequence number of any stored LSP from the same originating router. If the newly received LSP has a larger sequence number, it is stored in place of the previously stored LSP, otherwise not.

The sequence numbers are typically limited to a maximum value ($2^n-1$ for an n-bit sequence number). Because the sequence number is incremented each time a new LSP is created by an originating router, the binary representation of the sequence number will eventually overflow. If the sequence number is allowed simply to roll over to zero, new LSPs will have lower sequence numbers than previous LSPs, and will be incorrectly ignored in favor of the previous, high numbered LSPs, creating system errors.

One way to reduce the frequency of sequence number overflow errors is to increase the size of the sequence number field. However, this solution is not infallible, as transmission errors in the communications links may create anomalies in LSPs transmitted through the faulty links. For example, a sequence number can be corrupted to a higher number, in which case the sequence number can overflow regardless of the size of the sequence number field.

Another way to deal with sequence number overflow errors is to represent the sequence number space as a circular space. A circular space uses specialized mathematics to compare two sequence numbers and determine which is more recent. For example, in an n-bit circular sequence number space, if two sequence numbers are within $2^{n-1}$ of each other, the larger number is assumed to be more recent. Otherwise, the smaller number is assumed to be more recent. (For later reference, sequence number spaces which do not use this type of specialized mathematics will be called linear spaces.) In a circular space, when a sequence number overflows from $2^n$ to zero, the new sequence numbers with values near zero will be assumed to be more recent than the older sequence numbers with values near $2^n$. Other similar methods use a "lollipop" sequence number space, so named because, in a lollipop space, an n-bit sequence number, instead of overflowing from $2^n$ to zero, begins with a linear space and, when incremented beyond a certain value, moves into and remains in a circular space. The mathematics for comparing sequence numbers are suitably modified to account for the lollipop overflow characteristic.

Several routers in a computer network are often grouped together, so that the routing of the group's data transmissions may be controlled by a single local authority. One way in which this is accomplished is to form a central "pseudo-router", through which each of the routers communicate with each other and the network. One of the routers in the group (the designated router) is responsible for the duties of the pseudo-router. LSPs indicating this fact are issued by the designated router. Often, it is necessary to transfer the duties of the designated router from one of the routers in the group to another router. In this case, the previously originated link state packets indicating the previous designated router must be renounced, and the new link state packets indicating the new designated router must be issued.

Another fault condition in a network is a router crash, where one of the routers stops working. Once a router crash is rectified, the router must be able to rejoin the network in a well-behaved manner.

SUMMARY OF THE INVENTION

One aspect of the invention is a method for aging and purging, from storage in nodes of a distributed system of nodes, packets which expire over time. Each packet contains a sequence number in a linear space, data identifying its originating node, and data indicating the time remaining until it expires. Each node regularly modifies the data in each packet stored therein to indicate that less time remains before the packet expires, and each node subsequently erases from storage any packet which is expired.

According to another aspect of the invention, when a node receives a transmitted packet which has the same originating node, and the same sequence number, as a packet previously stored in the receiving node, if the transmitted packet contains data indicating that it is expired, the node stores the transmitted packet in place of the previously stored packet, and attempts to send the transmitted packet to other neighbors.

According to another aspect of the invention, each node which receives a transmitted packet modifies the data indicating the time remaining before the transmitted packet expires to indicate that less time remains before the transmitted packet expires.

According to another aspect of the invention, the system is purged of all packets originated by a given node by transmitting to at least one node of the system a purging packet. The purging packet identifies its originating node as the given node, has a sequence number latest in the sequence of packets originated from the given node, and contains data indicating that it is expired. Reasons for purging include: where a sequence number has reached a maximum value, or where previously issued packets contain invalid information.

Another aspect of the invention is a node in a network configured to apply any of the above methods.

According to another aspect of the invention, each such node is a router, the distributed system of nodes is a routing network, and the packets are link state packets.

DESCRIPTION OF THE PREFERRED EMBODIMENT

We first briefly describe the drawings.

STRUCTURE AND OPERATION

Figure 1:
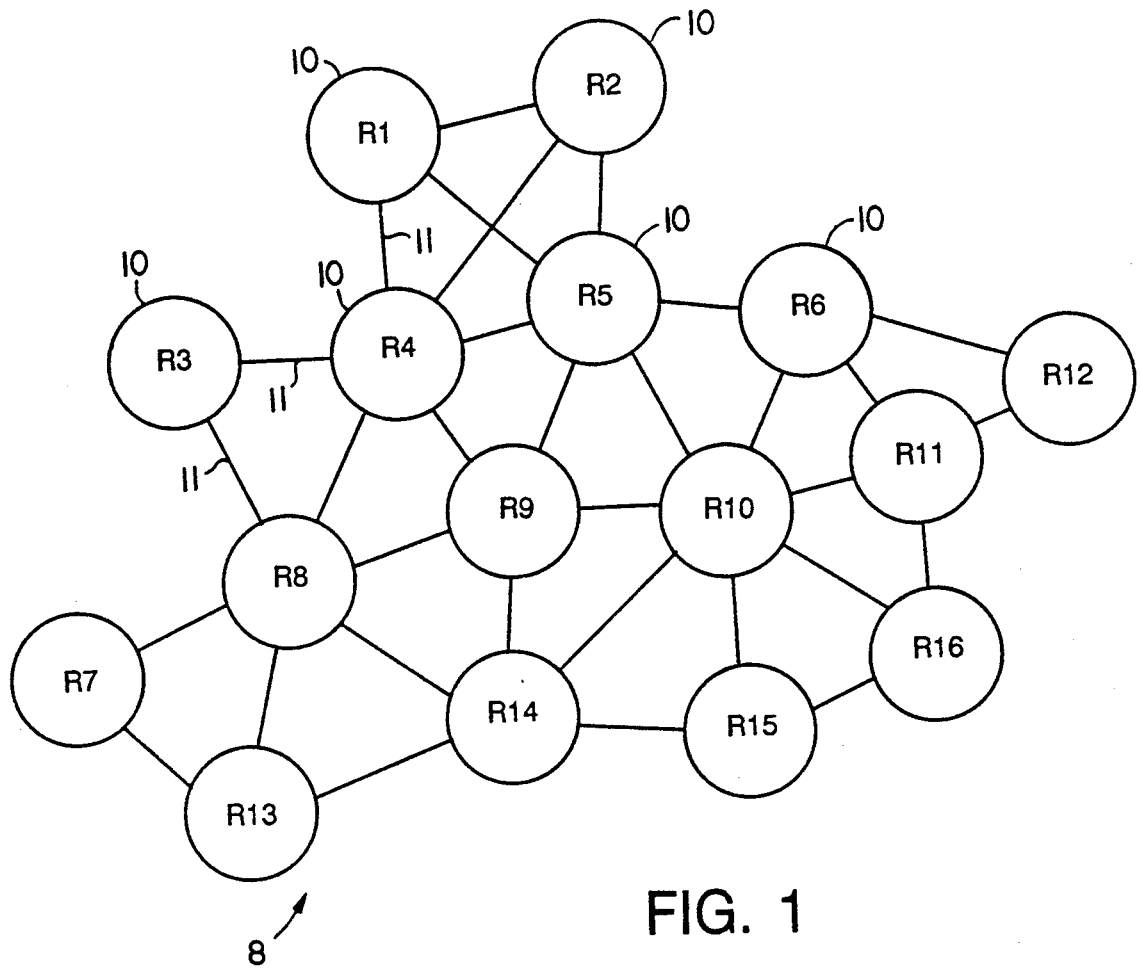
FIG. 1 is a diagram of a routing network.

Referring to FIG. 1, a routing network 8 for digital data processors has routers 10 (labeled R1, R2, R3, etc.) interconnected by links 11. Each router stores a database of the most recent link state packets generated by the routers in the network (including the most recent LSP of the router storing the database). Each LSP is originated at one of the routers of the network, and is then sent from its originating router to other routers through the network.

The invention allows for very robust transmission of LSPs through the network of FIG. 1. According to the invention, the network of FIG. 1 has greatly increased "survivability" in the presence of fault conditions, that is, the routers are able to recover rapidly from network errors. In addition, the invention provides for a simple method for purging the network of all LSPs from a given originating router. Network purges may be used to reset sequence numbers on overflow conditions, to renounce the previous link state packets of a designated router which has been replaced, or in any other situations where purging the network of LSPs may be necessary.

Figure 2A:
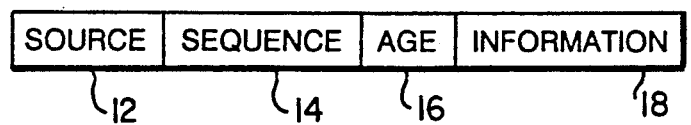
FIG. 2A is a diagram of a link state packet structure.

FIG. 2A shows a link state packet structure according to the invention. The structure contains a plurality of fields 12, 14, 16, and 18.

The source field 12 indicates the router which originated the LSP. When the LSPs are stored in the router databases, they are located according to the identity of their originating router, using this field.

In addition to the source field, each LSP also contains a sequence field 14 which contains a sequence number indicative of the relative age of the LSP among other LSPs generated by the same originating router. The sequence number may be used by the routers in the network to determine the relative ages of a received LSP and any previously stored LSPs. The relative ages of two LSPs must be determined so that a router may store the more current LSPs and ignore less current LSPs.

In the present embodiment of the invention, the sequence number is an integer. This integer is set equal to the value of a counter in the originating router when the LSP is created. To indicate the relative age of LSPs, the router counter is incremented each time a new LSP is originated by that router. The sequence numbers reside in a linear space. Therefore, LSPs with larger sequence numbers are assumed to be later in sequence (more recent). To deal with the effects of counter overflow, the invention provides a means for purging the network of old LSPs from a given router. If a router counter reaches its maximum value, the network is purged of LSPs from that router. After purging the network, the counter in the router may be reset to zero and new, low numbered, LSPs may be generated without error.

The age field 16 stores the remaining useful lifetime of a LSP. This field indicates how long a LSP may continue to be used by the network before it is no longer valid. When a LSP is no longer valid, a purging process is initiated to remove it from all router databases. As will be discussed fully in conjunction with FIG. 6, each router in the network decrements (in response to a clock) the age of all of its stored LSPs on a regular basis. In addition, the age of a received LSP is automatically decremented before the LSP is stored. Therefore, when a stored LSP is forwarded by a router, the age field of the forwarded LSP equals a reduced value. As a LSP is propagated through the network and stored in nodes, it ages until its age reaches zero, at which time it is purged from all of the routers of the network. The age field is important to network robustness, in that it helps enforce a bound on the longest possible time that a LSP will remain in the network. Also, as will be seen more fully later, the age field may be used to initiate a network purge, which clears the network of all LSPs from a particular originating router. This ability can be very useful in some error conditions, such as sequence number overflows.

The information field 18 contains the actual information in the packets which is collated by each router. In the particular embodiment of the invention, this is the link state information.

Figure 2B:
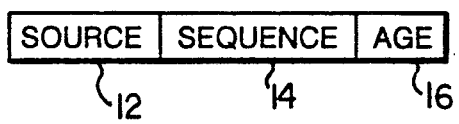
FIG. 2B is a diagram of an acknowledgement structure.

FIG. 2B shows an acknowledgement message. When a LSP is received by a receiving router, an acknowledgement message is transmitted to the neighbor from which the LSP was sent. The acknowledgement message indicates to the neighbor that transmission has been completed, and verifies the data that was transmitted. As shown in FIG. 2B, the acknowledgement message includes a source field 12, a sequence field 14, and an age field 16, which are simply copies of the corresponding fields in the acknowledged LSP. When a router relays a LSP to a neighbor, it will continuously transmit the LSP to the neighbor until it receives a valid acknowledgement message for the LSP. Therefore, if transmission errors are occurring between the two routers, a LSP will continue to be transmitted until it is correctly received and acknowledged. This increases the network robustness.

When an acknowledgement message is received, a router checks for stored LSPs with the same originating node in its source field 12. If such an LSP exists, the sequence numbers of the stored LSP and the acknowledgement packet are compared. If the two are unequal, the acknowledgement packet is ignored, because it cannot be a valid acknowledgement of the stored packet. However, if the sequence numbers are equal, then the age fields of the stored LSP and acknowledgement are compared. If both age fields are non-zero, the acknowledgment is accepted as valid. Also, if both ages are zero, the acknowledgement is accepted as valid. However, if one age is zero and the other is not, the acknowledgement is not accepted as valid. This helps the network to propagate purging packets, which will be discussed later.

Figure 3:
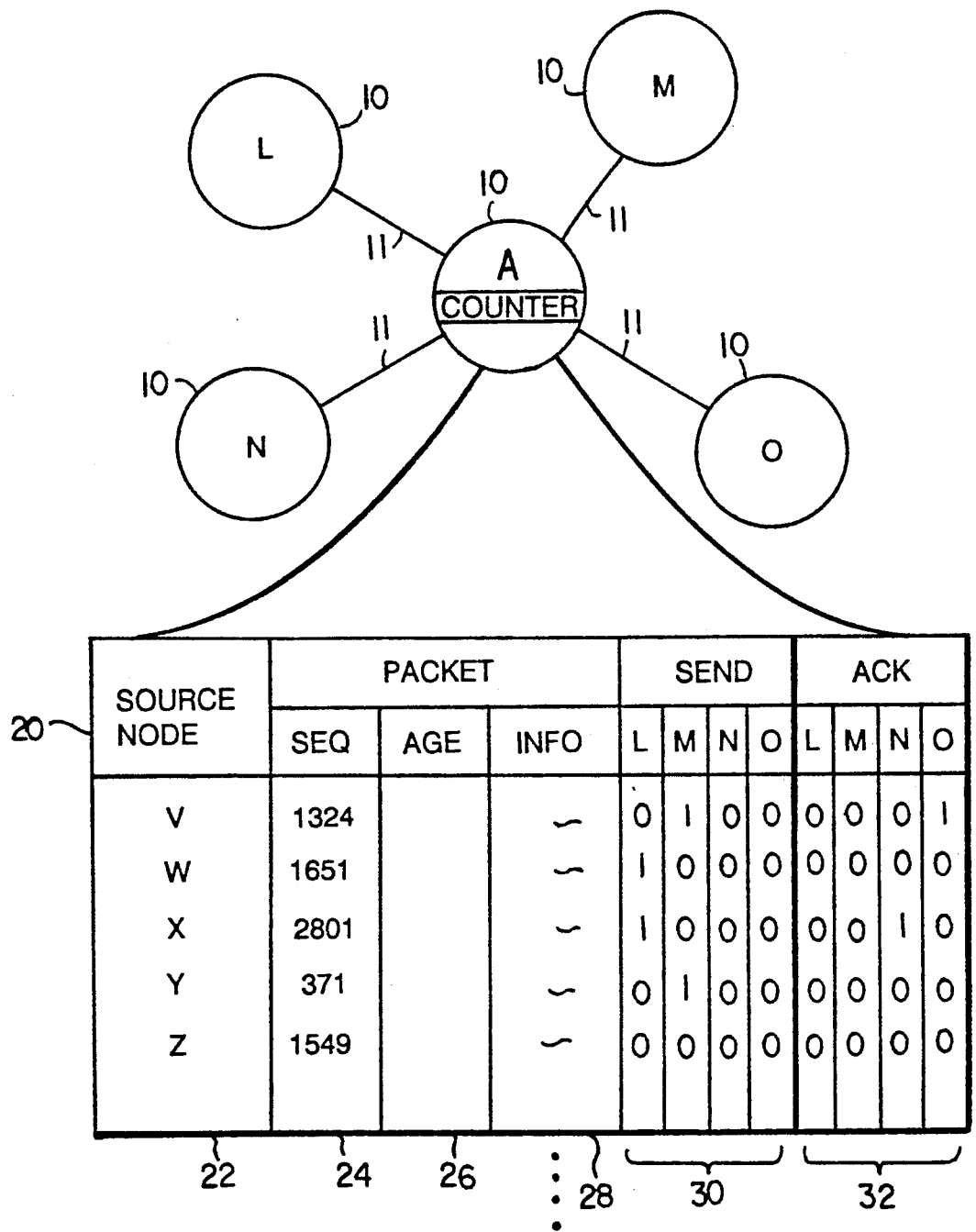
FIG. 3 is diagram of a router, its neighbors, and the database of link state packets and flags stored in the router.

FIG. 3 shows a router A and four neighboring routers L, M, N, and O. A and its four neighbors are connected by communications links 11. Router A maintains a counter which, as discussed before, indicates the age of new LSPs originated by A relative to previous LSPs originated by A. A also maintains a database 20 of LSPs previously originated by the other routers of the network.

The database 20 is shown near the router A in FIG. 3. The database contains several fields. One set of fields is associated with each originating router in the network. The first field 22, labeled "source", indicates the originating router for the LSP information stored in the corresponding row of the database.

The next three fields 24, 26, and 28 store information from the most current LSP originated by the indicated source router. The information in these fields includes the sequence number (SEQ) 24, AGE 26, and information (INFO) 28 fields of the LSP as discussed in conjunction with FIG. 2A.

Field 30 of database 20 contains a SEND flag for each of the neighbors of router A. For example, router A's database includes a SEND flag for neighbors L, M, N, and O, which are A's neighbors, as seen in FIG. 3. Field 32 contains a acknowledge ACK flag for each of the four neighbors L, M, N and O.

The SEND flags 30 indicate that the corresponding LSP should be sent to the corresponding neighbor. For example, the SEND flag for source V and neighbor M is set, indicating that the stored LSP originated by router V should be sent to neighbor M. Also, the SEND flag for source W and neighbor L is set, indicating that the stored LSP originated by router W should be sent to neighbor L. In a similar fashion, the ACK flags 32 indicate that the corresponding LSP should be acknowledged to the corresponding neighbor. For example, the ACK flag for source V and neighbor O is set, indicating that the stored LSP originated by router V should be acknowledged to router O. Also, the ACK flag for source X and neighbor N is set, indicating that the stored LSP originated by router X should be acknowledged to router N.

The SEND and ACK flags 30 and 32 are used as reminders to router A to forward LSPs to neighbors and to acknowledge LSPs received from neighbors. Using these flags as reminders, router A may multitask its LSP transmission duties with other, unrelated processing, without using a queue for transmissions. As will be fully discussed later, when LSPs are received or acknowledged, the flags 30 and 32 are accordingly set or cleared. The SEND flags 30 are set where a LSP should be forwarded to other neighboring routers. The SEND flags are cleared when neighboring routers send back properly corresponding acknowledgement messages. The ACK flags 32 are set where a LSP should be acknowledged to the neighbor from which it was received. The ACK flags are cleared when valid acknowledgements are received, as determined by the conditions discussed above.

Figure 4:
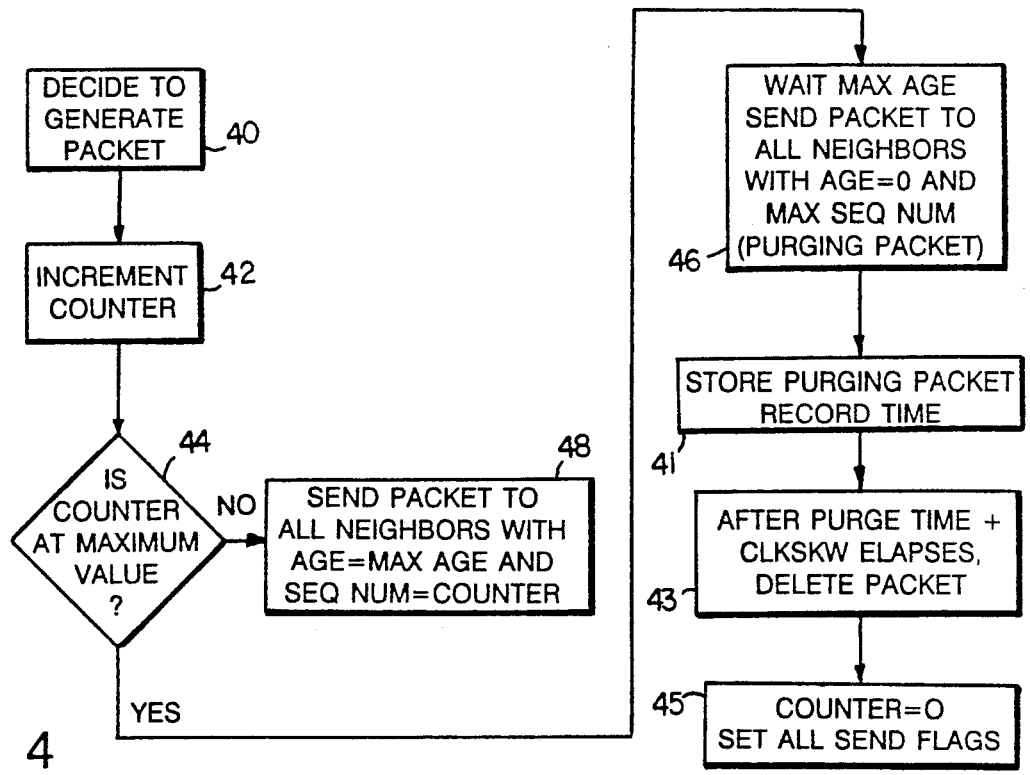
FIG. 4 is a flow chart of generating a link state packet at a router.
Figure 6:
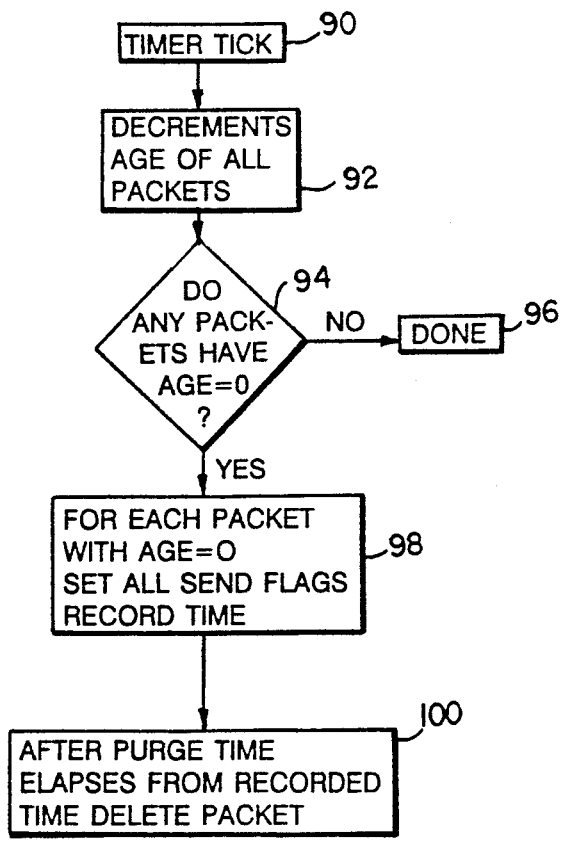
FIG. 6 is a flow chart of counting time at a router.
Figure 5:
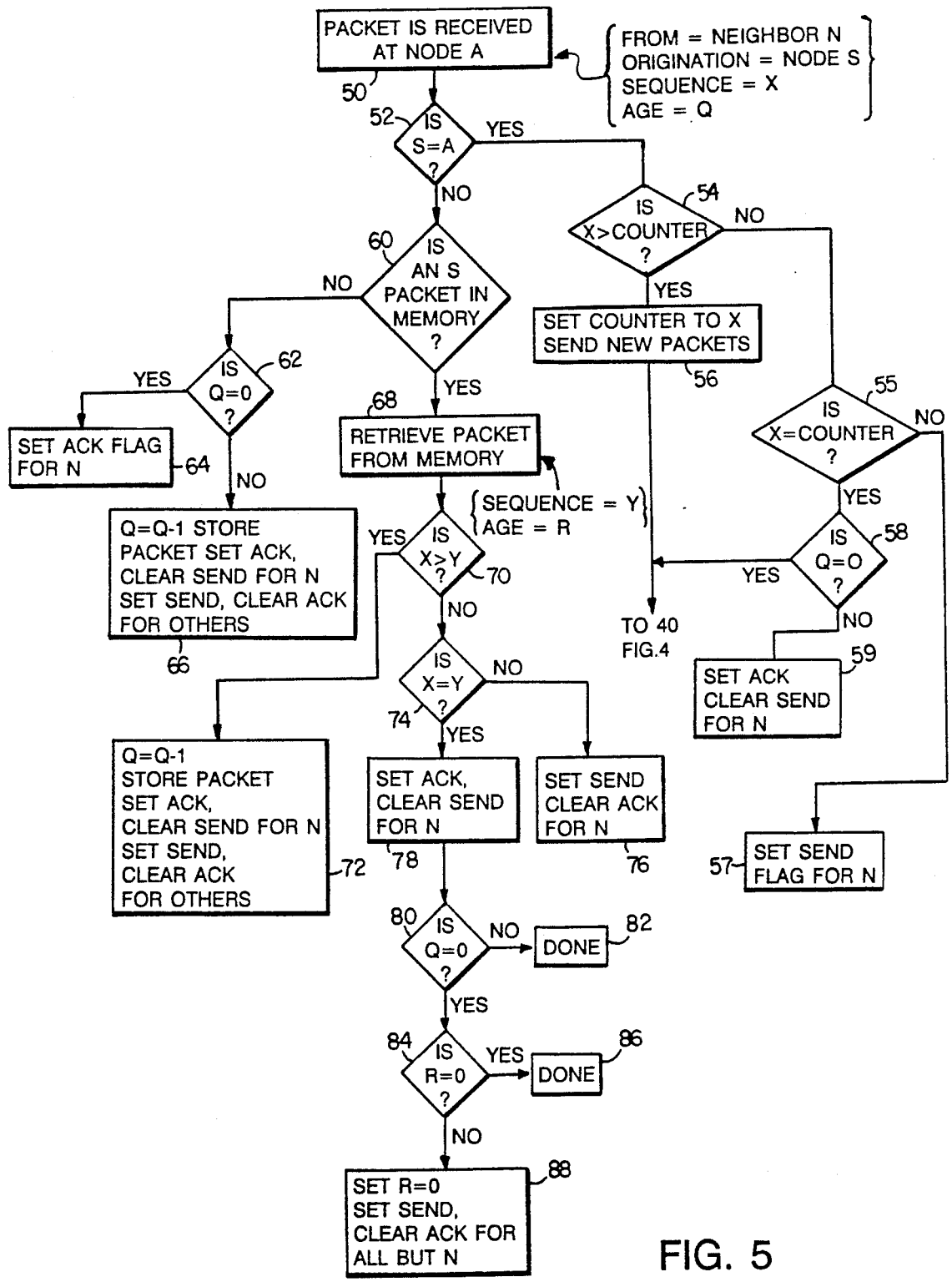
FIG. 5 is a flow chart of receiving a link state packet at a router.

FIGS. 4 through 6 contain flow diagrams of the procedures to be used by routers in counting time and receiving, transmitting, and storing LSPs. In the presently preferred embodiment of the invention, these procedures are performed by software running on a general purpose computer. In other embodiments, the procedures may be performed by dedicated computing hardware.

FIG. 4 shows the procedure by which LSPs are generated and sent by originating routers. When an originating router decides to generate a LSP 40, it first increments its internal counter 42, in order to indicate that the new LSP is later in sequence (younger) than previously generated LSPs. The router then checks 44 if the counter has been incremented to its maximum value.

As discussed above, if the counter has been incremented to its maximum value, it will overflow on the next increment. To solve this problem, the network should be purged, 46, of all LSPs previously originated by the router.

A simple way to purge the network of all LSPs is to simply not issue another LSP until the maximum age of all previously issued LSPs (typically two hours) has elapsed. In this way, all previously issued LSPs will expire, and will be simply deleted by their host databases. However, this method forces the node to wait a long time to reset to zero sequence number.

According to the invention, a node may quickly purge the network of all packets originated by a given node. To accomplish this, the originating router sends a "purging LSP" to all of its neighbors. A purging LSP has the maximum sequence number and also has zero age. Since the purging LSP has the maximum sequence number, it will be stored and forwarded by every router 10 which receives it. However, because the purging LSP also has zero age, it will quickly be purged by each of these routers. The invention provides a mechanism which insures that enough time is allowed for a router to forward the purging LSP to other routers before it is purged from the forwarding router. This will be further discussed later.

In preferred embodiments of the invention, a node which wishes to purge the network of packets originated by itself, 46, first waits for the maximum packet age, and then issues a purging LSP. This is a conservative solution which allows for maximum certainty that the network is purged. (A more optimistic approach is not to wait for the maximum age, but to send the purged packet directly. In rare situations this optimistic approach may not guarantee that all packets will be purged, which might then result in further purging traffic.) After the purging LSP is sent to the network, the network will quickly be purged of all LSPs from the corresponding originating router. Then new LSPs can be sent with the minimum sequence number.

In other situations, a router may wish to renounce all of its previously originated LSPs before its sequence number reaches its maximum value. This may occur, for example, where the router had previously been the designated router for a group, and is no longer. In these cases, the router may purge the network (by following steps 46, 41, and 43 in the flow chart) to renounce the previously originated LSPs.

After the purging packet is set up for transmission to the node's neighbors, the node stores the purging packet in its own database (i.e. conceptually transmits the packet to itself), and records the time.

To ensure that enough time is allotted to forward an expired LSP before it is purged from a database, a purge timer is used. The purge timer is started when a zero age LSP is first stored in memory. The purge timer is initialized to a predetermined purge time. After the purge time, the zero age LSP is deleted from memory. The required time may vary depending upon the particular embodiment of the invention. In the presently preferred embodiment, the purge time is approximately two minutes. The use of a purge time allows the network to count the age of LSPs down to zero and purge LSPs from memory expediently, while also allowing purging LSPs enough time to propagate throughout the network.

After a node issues a purging packet and stores the purging packet in its database, the node must wait at least the purge time to ensure that the purging packet has fully propagated through the network, and has been deleted from all of the databases. In addition, the node must wait enough time to eliminate the effects of clock skews (caused by the time necessary to actually propagate the purging packet) which may cause some purging packets to still exist in the network. Therefore, after issuing the purging packet, the node waits 43 the purge time and an additional clock skew time, and then deletes 20 the purging packet from its own database, resets its counter 45, and issues new LSPs with zero sequence numbers.

If, 48, the counter is not at its maximum value, then a LSP is simply generated with the maximum age value and a sequence number equal to the counter value. This LSP will then be propagated throughout the network in the ordinary fashion.

FIG. 5 illustrates the procedures by which a given router (which will be called router A) receives (and processes) a LSP from a neighboring router N. When the LSP is received 50, it is parsed to determine its originating router, its age, and its sequence number. As shown in FIG. 5, the LSP's originating router is router S, its sequence number is X and its age is Q.

Next, router A checks 52 whether the originating router S for the LSP is itself, i.e. router A. If so, then the LSP received by router A was also originated by router A. This circumstance is entirely likely, and as will be seen later, LSPs are sent back to their originating router intentionally to warn of error conditions. When a LSP is returned in this way, router A checks whether the contents of the received LSP are consistent with the current state of the router. First, the sequence number X of the received LSP is compared 54 to the current value in the counter in router A. If the counter in router A is less than the sequence number of the received LSP, it is indicated that a router crash or other malfunction has caused the counter in the router A to become less than the sequence numbers of LSPs in the network. In this case, 56, the counter in router A is simply set equal to the sequence number X of the received LSP. Then a new LSP is originated and sent to the network by router A (by the method illustrated in FIG. 4). In this way, router A gracefully recovers from the fault condition, and simply steps into alignment with the LSPs in the network.

However, if, 55, the counter is equal to or greater than the sequence number of the received LSP, then the counter is tested for equality to the sequence number. If not equal, 57, then the packet stored in neighbor N is older than the packet most recently generated by node S. Therefore, to send the most recent packet to node N, the send flag for N is set. Alternatively, if, 58, the sequence number and counter are equal, the age Q of the received packet is checked. If the age of the received packet is zero, new packets should be sent to the network. In this case, the node follows the steps shown in FIG. 4. However, if, 58, the age of the received packet is not zero, the received LSP is simply acknowledged to neighbor N by setting the ACK flag and clearing the SEND flag for neighbor N.

If, 60, router A is not the originating router of the received LSP, then router A checks whether a LSP corresponding to originating router S exists in router A's database 20.

If, 62, no LSP for the originating router exists in the database, then the age of the received LSP Q is checked. If, 64, the age of the received LSP Q is zero, then the LSP is acknowledged to neighbor N, but not stored, since it will be purged anyway. In some cases, it may be more computationally convenient to actually store the LSP and to then immediately purge it from the database. Either option ignores the LSP. If the received LSP is a purging LSP (as discussed above), the LSP can be ignored because the lack of a LSP from router S in A's database indicates that A's database is already purged. If, 66, the age of the received LSP is not zero, then the age of the received LSP is decremented (to guarantee that the LSP ages as it propagates through the network). The modified LSP is then stored in the database and relayed to other neighbors in the network (by setting the send flag for all of A's neighbors other than N, and setting the ACK flag for neighbor N).

If, 68, a LSP does exist in the database for the originating router S, then the sequence number Y and age R of the LSP stored in the database is retrieved. The sequence number Y of the stored LSP is then compared, 70, to the sequence number X of the received LSP. If, 72, the sequence number of the received LSP is higher, then the received LSP is more current. In this case, the age of the received LSP is decremented (for reasons discussed above), and the modified LSP is then stored in the database and relayed to other neighbors in the network (by setting the send flag for all of A's neighbors other than N, and setting the ACK flag for neighbor N). However, if, 74, the sequence number of the received LSP is not greater than the sequence number of the stored LSP, then the sequence numbers are compared for equality.

If, 76, the sequence number of the two LSPs are not equal, then it must be that the sequence number of the received LSP is less than the sequence number of the stored LSP. In this case, neighbor N has a less current version of the LSP than router A. Therefore, neighbor N's database should be updated by the more current version of the LSP. To accomplish this, router A sends the stored LSP back to neighbor N (by setting the send flag and clearing the ACK flag for neighbor N).

If, 78, the sequence numbers of the received and stored LSPs are equal, then the received LSP is no more current than the stored LSP, and is simply acknowledged to neighbor N (by setting the ACK flag and clearing the send flag for N). However, router A also performs other tests on the received LSP, because the sequence numbers X and Y may be at the maximum value, and the received LSP may be a purging LSP with zero age. To deal with this possibility, the age of the received LSP is checked 80.

If, 82, the age Q of the received LSP is not zero then no additional actions occur. However, if the age of the received LSP is zero, then the age R of the stored LSP is checked 84.

If, 86, the age of the stored LSP is also zero, then nothing is done 86. However, if, 88, the age of the stored LSP is not zero, then the received LSP has zero age and the stored LSP does not. In this case, the age of the stored LSP is set to zero. Because the stored LSP then has zero age, it will be purged from the network. Before it is purged, however, the LSP is relayed to the rest of the network (by setting the send flag and clearing the ACK flag for all the neighbors other than N). As discussed above, a purge timer is started when the zero age LSP is first stored in memory. After the purge time, the zero age LSP is deleted from memory.

FIG. 6 illustrates the procedures by which a router counts time according to the invention. To account for the passage of time, a timer tick occurs 90 on a regular basis. The timer ticks may be linked to a synchronized network clock. After the timer tick, the ages of all of the LSPs in the database are decremented 92. The age of each of the LSPs is then checked 94. If, 96, none of the LSPs have zero age, then processing is finished. However, if, 98, LSPs do have zero age then these LSPs should be purged from the network.

If a LSP has expired at a given node, it is important the all LSPs stored in the network also expire. It is likely that the ages of several versions of the same original LSP will become different as the versions are transmitted through the network, because of the different routes taken through the network, and the random effects of synchronization of timer ticks and packet transmissions. Therefore, if a packet is expired, 98, the send flag for the packet is set for all neighbors. This causes all of the databases in the neighboring nodes to be updated to contain an expired version of the LSP. Additionally, for each LSP with zero age, a purge timer is started.

After the purge time has elapsed 100, the LSP is deleted from memory.

It is intended that all matter contained in the above detailed description or shown in the accompanying drawings be interpreted as illustrative rather than restrictive, with the scope of the invention being indicated by the appended claims. For example, for the purpose of the reliable broadcast method which is described herein, it is not necessary that the packets be LSPs, or that the network be a routing network. Any network and information that has the characteristics of routers and LSPs (i.e., that every node needs the most recently generated information from every other node) can use this protocol. The sequence numbers in the linear space need not be integers and need not progress from lower values to higher values. All changes which are within the meaning and range of equivalency of the claims are therefore intended to be embraced herein.

Having described this invention, what is claimed as new and secured by Letters Patent is:

1. A method for aging and purging from storage in each node of a distributed system of nodes, packets which expire over time, each said packet comprising a sequence number in a linear space, data identifying its originating node, and data indicating the time remaining until said packet expires, the method comprising
causing each node to regularly modify the data is each said packet stored therein to indicate that less time remains before each said packet expires than the time that remained before said data was modified, and
causing each node, when a given packet has expired, to wait a purge time approximately equal to the time necessary for a packet to propagate through said distributed system, and then erase said given packet.

2. The method of claim 1 further comprising
causing each node which receives a transmitted packet which has the same originating node, and the same sequence number, as a packet previously stored in the receiving node, where said transmitted packet includes data indicating said transmitted packet is expired, to modify said stored packet to indicate that said stored packet is expired.

3. The method of claim 2 further comprising
causing each node which receives a transmitted packet to modify the data indicating the time remaining before said transmitted packet expires to indicate that less time remains before said transmitted packet expires than the time that remained before said data was modified.

4. The method of claim 2, wherein said nodes are routers, said distributed system of nodes is a routing network, and said packets are link state packets.

5. The method of claim 1 further comprising
causing each node which receives a transmitted packet to modify the data indicating the time remaining before said transmitted packet expires to indicate that less time remains before said transmitted packet expires than the time that remained before said data was modified.

6. The method of claim 5, wherein said nodes are routers, said distributed system of nodes is a routing network, and said packets are link state packets.

7. A method for purging, from storage in each node of a distributed system of nodes, packets originated from a given node, each said packet comprising a sequence number in a linear space, data identifying its originating node, and data indicating the time remaining until said packet expires, the method comprising
transmitting to at least one node of said system a purging packet, said purging packet
identifying its originating node as said given node,
having a sequence number latest in the sequence of packets originated from said given node, and
including data indicating that said purging packet is expired.

8. The method of claim 7, wherein said nodes are routers, said distributed system of nodes is a routing network, and said packets are link state packets.

9. The method of claim 8, further comprising
causing each node which originates a packet having the maximum sequence number to subsequently originate a purging packet.

10. The method of claim 8, further comprising
causing each node which has originated packets which contain invalid information to subsequently originate a purging packet.

11. The method of claim 10, wherein said invalid information incorrectly indicates a designated router for a group of routers.

12. A controller circuit for maintaining a database storing link state packets, each said packet comprising a sequence number in a linear space, data identifying its originating controller circuit, and data indicating the time remaining until said packet expires, comprising
communications circuitry connecting said controller circuit to at least another controller circuit for receiving transmitted packets and sending stored packets, and
a computing circuit for managing said database, said computing circuit being programmed to:
regularly modify the data in each said packet stored in said database to indicate that less time remains before each said packet expires than the time that remained before said data was modified, and when a given packet has expired, wait a purge time approximately equal to the time necessary for a packet to propagate to all other controller circuits which communicate packets to said controller circuit, and then erase said given packet.

13. The controller circuit of claim 12, wherein said computing circuit is further programmed to modify a stored packet to indicate that it is expired if said transmitted packet has the same originating node as said stored packet and the same sequence number as said stored packet, and said transmitted packet is expired.

14. The controller circuit of claim 13, wherein said computing circuit is further programmed to modify each transmitted packet received by said router to indicate that less time remains before said packet expires than the time that remained before said data was modified.

15. A controller circuit for maintaining a database storing link state packets, each said packet comprising a sequence number in a linear space, data identifying its originating controller circuit, and data indicating the time remaining until said packet expires, comprising communications circuitry connecting said controller circuit to at least another controller circuit for receiving transmitted packets and sending stored packets, and a computing circuit for managing said database, said computing circuit being programmed to:

purge said network of all packets originated by said controller circuit by transmitting a purging packet, said purging packet identifying its originating controller circuit as said controller circuit, having a sequence number latest in the sequence of packets originated from said controller circuit, and including data indicating that said purging packet is expired.

16. The controller circuit of claim 15, wherein said computing circuit is further programmed to purge said network if said router originates a packet having the maximum sequence number in said linear space.

17. The controller circuit of claim 16, wherein said computing circuit is further programmed to purge said network if said router has originated packets containing invalid information.

18. A method for aging and purging from storage in each node of a distributed system of nodes, packets which expire over time, each said packet comprising a sequence number in a linear space, data identifying its originating node, and data indicating the time remaining until said packet expires, the method comprising causing each node to regularly modify the data in each said packet stored therein to indicate that less time remains before each said packet expires than the time that remained before said data was modified, causing each node which receives a transmitted packet to modify the data indicating the time remaining before said transmitted packet expires to indicate that less time remains before said transmitted packet expires than the time that remained before said data was modified, causing each node, when a packet has expired, to wait a given purge time and then erase the packet, and causing each node which receives a transmitted packet which has the same originating node, and the same sequence number, as a packet previously stored in the receiving node, where said transmitted packet includes data indicating said transmitted packet is expired, to modify said stored packet to indicate that said stored packet is expired.

19. A method for aging and purging from storage in each node of a distributed system of nodes, packets which expire over time, each said packet comprising a sequence number in a linear space, data identifying its originating node, and data indicating the time remaining until said packet expires, the method comprising causing each node to regularly modify the data in each said packet stored therein to indicate that less time remains before each said packet expires than the time that remained before said data was modified, transmitting to at least one node of said system a purging packet, said purging packet identifying its originating node, having a sequence number latest in the sequence of packets originated from said originating node, and including data indicating that said purging packet is expired, and causing each node, when a packet has expired, to wait a given purge time and then erase the packet.

20. A method for purging from storage in each node of a distributed system of nodes, packets originated from a given node, each said packet comprising a sequence number in a linear space, data identifying its originating node, and data indicating the time remaining until said packet expires, the method comprising causing each node which has originated a packet having the maximum sequence number or which contains invalid information to subsequently originate a purging packet, said purging packet identifying its originating node, having a sequence number latest in the sequence of packets originated from said originating node, and including data indicating that said purging packet is expired, and transmitting said purging packet to at least one node of said system.

21. A method for aging and purging from storage in each node of a distributed system of nodes, packets which expire over time, each said packet comprising a sequence number in a linear space, data identifying its originating node, and data indicating the time remaining until said packet expires, the method comprising causing each node to regularly modify the data in each said packet stored therein to indicate that less time remains before each said packet expires than the time that remained before said data was modified, causing each node to erase from storage any packet which has expired, and causing each node which receives a transmitted packet which has the same originating node, and the same sequence number, as a packet previously stored in the receiving node, where said transmitted packet includes data indicating said transmitted packet is expired, to modify said stored packet to indicate that said stored packet is expired.

* * * * *

UNITED STATES PATENT AND TRADEMARK OFFICE
CERTIFICATE OF CORRECTION

PATENT NO. : 5,086,428

DATED : February 4, 1992

INVENTOR(S) : Radia J. Perlman et al.

It is certified that error appears in the above-identified patent and that said Letters Patent is hereby corrected as shown below:

Col. 9, line 59, "is" should be --in--.

Col. 10, line 16, "claim 2" should be --claim 3--.

Signed and Sealed this

Thirteenth Day of July, 1993

Attest:

MICHAEL K. KIRK

Attesting Officer

Acting Commissioner of Patents and Trademarks